H. A. GIBSON.
PLANT PROTECTOR.
APPLICATION FILED MAY 7, 1917.

1,257,477.

Patented Feb. 26, 1918.

Witnesses
Roland Foster
V. Kneeshaw

Inventor
H. A. Gibson

UNITED STATES PATENT OFFICE.

HENRY ADOLPHUS GIBSON, OF WINNIPEG, MANITOBA, CANADA.

PLANT-PROTECTOR.

1,257,477.  Specification of Letters Patent.  Patented Feb. 26, 1918.

Application filed May 7, 1917. Serial No. 166,992.

*To all whom it may concern:*

Be it known that I, HENRY ADOLPHUS GIBSON, of the city of Winnipeg, in the Province of Manitoba, Canada, have invented certain new and useful Improvements in Plant-Protectors, of which the following is the specification.

The invention relates to improvements in plant protectors in the nature of a protective wrapper placed around a young plant to protect the same from the elements, insects, grubs, worms and other harmful agents and the object of the invention is to provide a protector which will effectively do this work and which is arranged so that it can be manufactured quickly and cheaply and such that it will be strong and durable, a particular feature residing in the fact that it is put together such that when in use it will not be materially affected by water or wind.

With the above object in view the invention consists essentially in a protector arranged and constructed as hereinafter more particularly described and later pointed out in the appended claim, reference being had to the accompanying drawing in which:—

In the drawing like characters of reference indicate corresponding parts in the several figures.

Figure 1:
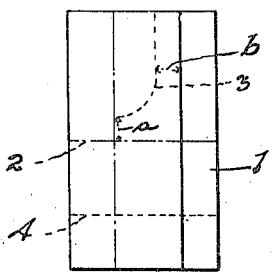
Figure 1 represents a side view of the complete or finished protector.
Figure 3:
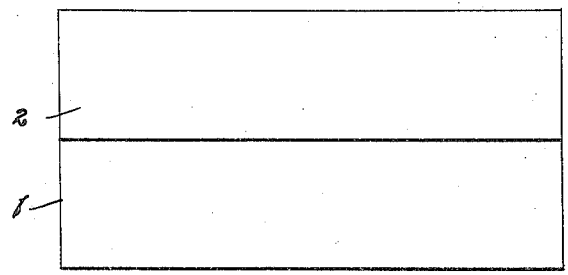
Fig. 3 represents a face view of the sheet from which the protector is made as it appears after the reinforcing flap has been turned down.

In order to better understand the nature of this invention and the value of it I wish to refer to a prior patent granted to me under Number 1194992 for a "garden tool" and under date of August 15, 1916.

In this patent I disclosed a transplanting device which was utilized to put a protective wrapper in the ground and around the young plant and the protective wrapper therein disclosed was simply a straight band of paper with the meeting edges overlapped and stuck. At that time it served to illustrate the manner in which the transplanting device was used to implant the paper.

Since that time I have devised a paper protector to be utilized in connection with my transplanting device but which is made and put together in such a way that it can be manufactured quickly and in quantities and at small cost and will withstand the elements for a season when implanted in the ground.

Figure 5:
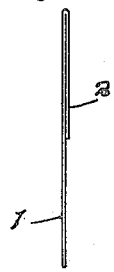
Fig. 5 represents an end view of the sheet as it appears in Fig. 4.
Figure 4:
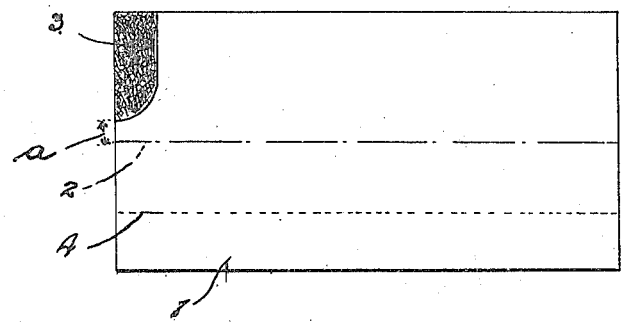
Fig. 4 represents a reverse view of the sheet shown in Fig. 3.
Figure 2:
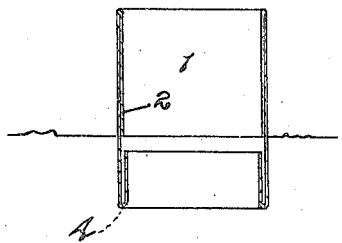
Fig. 2 represents a vertical sectional view centrally through the protector as it appears when in the ground.

The improved protector or wrapper forms the subject matter of this application. It is constructed in the following way, reference being now made to the drawing:

1 represents a substantially rectangular sheet of paper which is first folded lengthwise to provide a reinforcing flap 2 which in depth is considerably less than the depth of the remaining or body part of the sheet. After folding in this way the sheet is turned over and a sticking material such as paste or glue, as indicated at 3, is applied on one of the back upper corners, it being desirable, in applying this sticking material, that it terminate at the bottom a slight distance above the plane containing the then lower edge of the flap. This distance is represented at "$a$" in Figs. 4 and 5.

Next a folding, indicating line 4 is dotted on the front side of the sheet, (see Fig. 4) which indicated line passes the full length of the sheet, is parallel with the lower edge thereof and is set up from the said edge.

Figure 6:
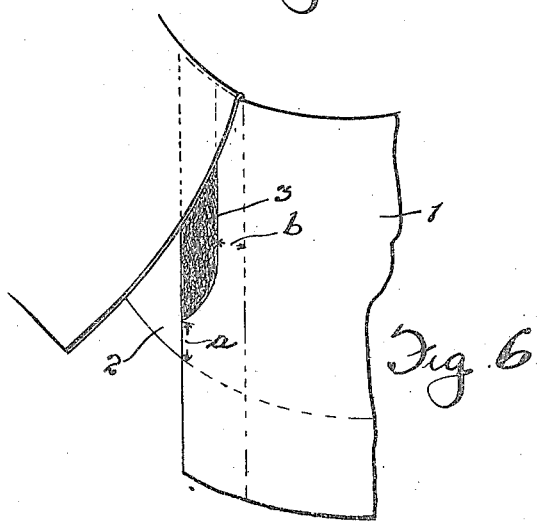
Fig. 6 represents an enlarged detailed perspective view showing the manner in which the two ends of the sheet are brought together and fastened.

The sheet is then taken in the hand and turned into a cylinder shape with the flap in and the glued end of the sheet is inserted between the flap and the body at the other end of the sheet (see Fig. 6) and in this operation it is desirable to insert the end of the sheet so that the glued part is well lapped, that is to say, so that the edge of the glued part is well in from the receiving edge of the sheet. This is actually shown by the distance indicated at "$b$" (Fig. 6). Once inserted the sheet is pressed flat and rubbed at the joint. This spreads the glue and sticks the ends permanently together completing the wrapper and at this point I wish to bring out the value of having the clearing distance "$a$" and "$b$". By providing these the sticking material, in the pressing together of the ends, will not be spread sufficiently to reach either the overlying edge of the sheet or extend beyond the lower edge of the flap.

Accordingly the joint as formed by the sticking material is in and fully protected by the extending paper from water, such as occurs when the plant is being artificially watered or when it rains.

Further in the manufacturing of these in quantities the two sides of the wrapper would be brought together when the glue was pressed and spread and in such an operation there would be the probability of the two sides of the wrapper being stuck together if the glue were allowed to extend to the lower edge of the flap.

By keeping the sticking material back, the distance "a" as indicated, the glue cannot spread far enough to be exposed beneath the edge of the flap.

When the protector is to be used it is applied on the holder, disclosed in my former patent, and the lower edge of the protector is turned up within the holder, the turn being made preferably at the dotted line 4.

The wrapper is inserted into the ground by the transplanting device a distance such that the lower edge of the flap is approximately at ground level. By marking and utilizing the protector or wrapper in this way sufficient of it is put into the ground to properly hold the wrapper and that part exposed above the ground is reinforced, being actually double.

In manufacturing these wrappers in quantities a number of sheets would be laid on top of each other with their ends all equally set back a distance equal to the width of the sticking material which one wishes to have applied on the end of the sheet. The sheets would be all folded at once to provide the flaps 2 and after this had been accomplished all the sheets would be turned over and then, by utilizing a brush, one would draw it over the overlapping edges of the sheet to apply the glue. Afterward the individual sheets would be picked out, turned into the cylindrical shape and individually stuck.

What I claim as my invention is:—

A plant protector comprising a substantially rectangular sheet of paper bent to form a cylinder with its adjacent edges overlapping, the paper at the ends of the cylinder being bent back on itself inside the cylinder and part of the overlapping portions spaced from the edge of the exterior sheet being glued together to form a joint the overlapping edges and one bent back end fitting closely to protect the glued joint.

Signed at Winnipeg, this 19th day of April, 1917.

HENRY ADOLPHUS GIBSON.

In the presence of—
GERALD S. ROXBURGH,
ROLAND FOSTER.

Copies of this patent may be obtained for five cents each, by addressing the "Commissioner of Patents, Washington, D. C."